(12) United States Patent
Landreth et al.

(10) Patent No.: US 8,404,038 B2
(45) Date of Patent: *Mar. 26, 2013

(54) COMPOSITIONS AND METHODS TO SEQUESTER FLUE GAS MERCURY IN CONCRETE

(75) Inventors: Ronald Ray Landreth, Mantua, OH (US); Sidney G. Nelson, Jr., Hudson, OH (US); Yinzhi Zhang, Baton Rouge, LA (US); Qunhui Zhou, Baton Rouge, LA (US); Christopher J. Nalepa, Zachary, LA (US)

(73) Assignee: Albemrle Corporation, Baton Rouge, LA (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/072,365

(22) Filed: Mar. 25, 2011

(65) Prior Publication Data

US 2011/0197791 A1    Aug. 18, 2011

Related U.S. Application Data

(63) Continuation-in-part of application No. 12/305,720, filed as application No. PCT/US2007/085474 on Nov. 23, 2007.

(51) Int. Cl.
| | |
|---|---|
| C04B 24/36 | (2006.01) |
| B01D 47/00 | (2006.01) |
| B01D 53/46 | (2006.01) |
| B01D 53/56 | (2006.01) |
| B01D 53/86 | (2006.01) |
| B01J 8/00 | (2006.01) |
| B01J 20/00 | (2006.01) |

(52) U.S. Cl. ......... 106/668; 423/210; 502/400; 502/418

(58) Field of Classification Search .................. None
See application file for complete search history.

(56) References Cited

U.S. PATENT DOCUMENTS

| | | | |
|---|---|---|---|
| 5,356,849 | A | 10/1994 | Matviya et al. |
| 6,027,551 | A | 2/2000 | Hwang et al. |
| 6,890,507 | B2 | 5/2005 | Cheng et al. |
| 6,953,494 | B2 | 10/2005 | Nelson, Jr. |
| 2003/0206843 | A1 * | 11/2003 | Nelson, Jr. .................. 423/210 |
| 2004/0206276 | A1 | 10/2004 | Hill et al. |
| 2006/0204418 | A1 * | 9/2006 | Chao et al. .................. 423/210 |
| 2006/0204430 | A1 | 9/2006 | Bool et al. |
| 2010/0212550 | A1 | 8/2010 | Zhang et al. |

OTHER PUBLICATIONS

Zhang, et al; Development of a New Method to Replace the Foam Index Test; 2007 World of Coal Ash; May 7-10, 2007; Covington, Kentucky, USA.

* cited by examiner

*Primary Examiner* — Emily Le
*Assistant Examiner* — Michael Forrest
(74) *Attorney, Agent, or Firm* — Marcy M. Hoefling; Jeremy J. Kliebert; James A. Jubinsky

(57) ABSTRACT

Mercury adsorbed from combustion gas by activated carbon can be sequestered in concrete containing air-entraining admixtures. The activated carbon may be made by providing a carbon char made from coconut shell, wood, or lignite that was activated by a method selected from the group consisting of activating with steam, activating with $CO_2$, activating in an environment containing free oxygen, and combinations thereof to provide an activated carbon with an Acid Blue 80 Index of less than about 30 milligrams per gram of carbon. The activated carbon may be injected into a combustion gas stream containing fly ash and mercury and may then be removed with fly ash from the gas stream. The resulting composition may be used as a partial substitute for cement in air-entrained concretes.

18 Claims, 1 Drawing Sheet

US 8,404,038 B2

COMPOSITIONS AND METHODS TO SEQUESTER FLUE GAS MERCURY IN CONCRETE

CROSS-REFERENCES TO RELATED APPLICATIONS

This application is a Continuation-In-Part of, and claims priority to, application Ser. No. 12/305,720, filed Dec. 19, 2008, entitled "Compositions and Methods to Sequester Flue Gas Mercury in Concrete," which is hereby incorporated by reference herein in its entirety.

BACKGROUND

Fly ash created from the combustion of coal is frequently used as a partial replacement for cement in concretes and mortars. Effluent gas from the combustion of coal contains mercury. This contaminant may be adsorbed by powdered activated carbon ("PAC") injected into the flue gas stream and collected with the fly ash in a particulate removal device. For example, a brominated PAC manufactured for mercury sorption is provided by U.S. Pat. No. 6,953,494. However, when known PAC sorbents used for mercury emission control become mixed in with the fly ash from coal-fired power plants, the ash can no longer be sold for its highest-value use, namely, as a partial replacement for cement in concretes. This is because the highly-adsorptive PAC used for capturing the mercury also adsorbs the air-entraining agent chemicals (AEAs) later added to the concrete slurry to generate the air bubbles required for concrete workability and freeze-thaw capabilities.

According to the American Coal Ash Association, the US produced 65.6 million metric (MM) tons of fly ash in 2008. Replacing cement in concrete is the primary use of fly ash. About 11.5 MM tons of fly ash went to the concrete market, and about 16.0 MM tons were used in structure fills, soil modification, and other applications. Reuse of fly ash to partially substitute cement in concrete represents a major success of waste recycling in the US and has significant economic, environmental, and technical benefits.

The economic benefits of using fly ash to replace a fraction of the cement in concrete include increased revenue from the sale of the ash, reduced costs for fly ash disposal, and savings from using the ash in place of the more costly cement. Concrete performance benefits include greater resistance to chemical attack, increased strength, and improved workability. Environmental benefits include reduced greenhouse gas emissions, reduced land disposal, and reduced virgin resource use. All of these benefits are lost if fly ash compositions contain prior-art mercury sorbents beyond de minimis levels. This is doubly negative, because not only must the fly ash be disposed of rather than beneficially used, but the opportunity is missed to physically and chemically sequester the mercury from release and interactions with the environment by encasing it the concrete.

For the majority of coal-fired power plants, those without sulfur-dioxide wet scrubbers, the lowest-cost, leading-candidate technology to comply with current reduced mercury emission requirements is the injection of PAC into the flue gas in front of the plants' existing particulate controls. In this process, however, the PAC gets mixed in with the plant's collected fly ash. Because of the high surface area of typical PACs and their high adsorption capacity, if even the smallest amount gets mixed in with fly ash, the fly ash can no longer be used in concrete. The PAC adsorbs the AEAs later added to the concrete slurry. These surfactants enable incorporation of the precise amount of air bubbles needed to create the air voids required for concrete workability and freeze-thaw capabilities. For plants that could otherwise sell their ash for concrete, but now must dispose of it, this would be a big economic loss. U.S. Department of Energy National Energy Technology Laboratory analyses indicate that this deleterious by-product effect would effectively quadruple the cost of mercury reductions at some plants.

Mercury emissions from cement kilns are also increasingly recognized as a problem. PACs could similarly be injected into these exhaust gases and be collected in the particulate removal devices that separate the cement kiln dust from the exhaust gases. However, because the collected cement kiln dust would then contain AEA-adsorbent PACs, it could no longer be sold as cement for air-entrained concretes.

Others have endeavored to make carbon mercury sorbents more concrete friendly or to improve their mercury performance.

In U.S. Patent Publication No. 2003/0206843, Nelson taught that post-treatment of PAC sorbent with a sufficient amount of ozone could beneficially affect the surface properties of the sorbent enough to decrease adsorption of AEAs and render fly ashes incorporating them useful for concrete. Unfortunately, it was also found that due to the high surface area of the PAC sorbent necessary for power plant mercury control, the amount of ozone required was too great and expensive for this route to have any practical utility. To sufficiently lower the AEA interference in that disclosure, for example, Nelson taught that on the order of 1 kilogram of ozone was required per kilogram of carbon. FIGS. 10 and 11 of the patent of Chen, U.S. Pat. No. 6,890,507, indicate a similar finding.

U.S. Pat. No. 6,027,551 to Hwang teaches that unburned carbon particles from the direct combustion of coal can be separated from fly ash, post-treated with oxygen-rich gas, ozone, or nitric acid to create an improved mercury sorbent, and then injected back into the fly ash-containing gas stream to remove mercury. However, this technology involves the processing of massive amounts of fly ash to separate the unburned carbon particles, which have a reduced mercury adsorption capacity compared to commercially-manufactured PAC, followed by a separate post-treatment step. Moreover, Hwang does not sequester his sorbent mercury away with the fly ash in concretes, but instead separates the carbon from the fly ash.

Rather than post-treating carbons as Nelson, Chen, and Hwang, other methods to directly produce PAC materials have been recently proposed. Bool, in U.S. Patent Application No. 2006/0204430, rapidly mixes a very hot, highly reactive, oxygen-enriched gas stream from a burner directly with a ground or pulverized carbonaceous feedstock to quickly and directly manufacture a powdered activated char that can then be used as a mercury sorbent. The high oxygen concentration, quick and intense mixing, fine particle size, and highly-elevated temperature significantly increase the devolatilization/carbonization rate of the carbonaceous feedstock. This contrasts with traditional, far-slower methods of producing activated carbon where the devolatilization/carbonization step is gradually and separately carried out at lower temperatures on coarse granular or pelletized feedstock in a rotary kiln or on the top levels of a multi-hearth furnace, in the presence of an inert, rather than oxygen-enriched, environment. To enable the sale of power plant fly ash as a component for concrete, Bool teaches to not mix his carbon with the fly ash, but to inject the carbon after the fly ash has already been collected in a first particulate collection device. Unfortunately, the Bool sorbent production process requires unique equipment and procedures and cannot be utilized with traditional, commercial equipment or on existing activated carbon production lines.

Thus, there is a need for mercury sorbent materials that may be used for mercury sorption in gas streams without impairing the ability of fly ash present in the gas stream to be used as a partial replacement for cement in air-entrained concrete.

THE INVENTION

This invention meets the above-described needs by providing methods comprising: providing a carbonaceous mercury sorbent precursor consisting of wood, lignite, coconut shell, and combinations thereof; activating or reactivating the mercury sorbent precursor by a method selected from the group consisting of activating with steam, activating with $CO_2$, activating in an environment containing free oxygen, and combinations thereof, to provide an activated carbonaceous mercury sorbent, wherein the activation temperature and time period is limited such that the Acid Blue 80 Index of the activated carbonaceous mercury sorbent does not exceed 30 mg per gram of sorbent; grinding the activated carbonaceous mercury sorbent after activation or reactivation to an average particle size less than about 325 mesh; injecting the activated carbonaceous mercury sorbent into a gas stream containing mercury, mercury-containing compounds, or a combination thereof, and fly ash, cement kiln dust, or a combination of fly ash and cement kiln dust, and allowing the activated carbonaceous mercury sorbent to contact the mercury or mercury-containing compounds to create mercury sorbent with adsorbed mercury; and removing the mercury sorbent with adsorbed mercury along with fly ash, cement kiln dust, or both, from the gas stream in a particulate control device, all such that the mercury sorbent with adsorbed mercury along with fly ash, cement kiln dust, or both, is suitable for combining with an AEA to provide a cementitious or pozzolanic composition. Also provided are such methods (i) that additionally comprise adding the mercury sorbent with adsorbed mercury along with fly ash, cement kiln dust, or both, to water, cement, and an AEA to provide a cementitious or pozzolanic composition; (ii) that additionally comprise adding sand and coarse aggregate; (iii) wherein activating the mercury sorbent precursor comprises activating with steam; (iv) wherein activating the mercury sorbent comprises activating in an environment containing free oxygen; (v) wherein activating the mercury sorbent precursor is performed using a rotary kiln, activation furnace, or multi-hearth furnace; (vi) additionally comprising adding at least one halogen or halogen compound to the activated carbonaceous mercury sorbent to create a halogenated activated carbonaceous mercury sorbent which contains about 0.1 to about 15 percent by weight halogen; (vii) wherein the activation is further limited in temperature and time period such that the Acid Blue 80 Index of the activated carbonaceous mercury sorbent does not exceed 15 mg per gram of sorbent; or (viii) additionally comprising adding the mercury sorbent with adsorbed mercury with either fly ash, cement kiln dust, or both to water, cement, and an air-entraining admixture to provide a cementitious or pozzolanic composition. The Acid Blue 80 Index ("ABI"), as introduced in U.S. application Ser. No. 12/305, 720 (Publication No. US 2010-0212550), is a relative measure of the amount of a particular dye, Acid Blue 80 (CAS 4474-24-2), that the carbon material adsorbs from a standard solution. The ABI can be quantitatively determined using standard UV-visible light spectrophotometry analysis technique. Additional information is provided below. The 2010-0212550 publication also denotes the anthracite PACs described therein as "C-PAC."

Also provided by this invention are compositions that comprise a powdered activated carbon having an ABI of less than about 30 milligrams per gram of adsorbent prior to any optional post-treatment with ozone or nitric acid and having mercury or mercury-containing compounds adsorbed thereon; either fly ash, cement kiln dust, or a combination thereof; and cement, an air-entraining admixture, sand, and water, wherein the powdered activated carbon is produced from a carbon source selected from the group consisting of wood, lignite, coconut shell, and combinations thereof. Also provided are such compositions (i) additionally comprising coarse aggregate; (ii) wherein the powdered activated carbon is produced from coconut shell; (iii) wherein the powdered activated carbonaceous mercury sorbent is produced from wood; (iv) wherein the powdered activated carbon is produced from a carbonaceous mercury sorbent precursor activated or reactivated in an environment containing free oxygen such that the ABI of the activated carbonaceous mercury sorbent does not exceed 30 mg per gram of sorbent prior to any optional post-treatment with ozone or nitric acid; (v) wherein the powdered activated carbon has an ABI of less than about 15 milligrams per gram of adsorbent prior to any optional post-treatment with ozone or nitric acid; or (iv) wherein the powdered activated carbon is produced from a carbonaceous mercury sorbent precursor activated or reactivated in an environment containing free oxygen.

FIGURES

The invention will be better understood by reference to the Figures in which.

Figure 1:
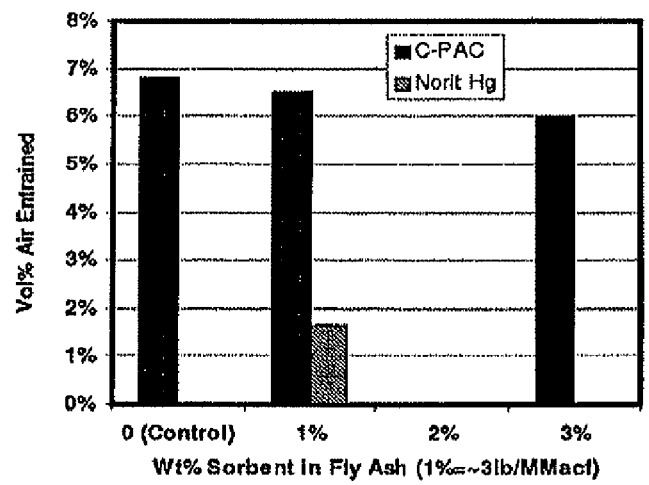
FIG. 1 is a bar chart contrasting the volumes of air voids entrained in wet concretes made with and without PACs.

We have discovered that fly ash compositions from coal-fired power plants that contain activated carbon mercury sorbents can, in fact, be utilized in air-entrained concretes if the carbon sorbents are manufactured in such a way so as to possess certain properties. These properties can best be summarized by the ABI metric. To enable use sequestering mercury in typical air-entrained concretes, activated carbons must be created with a sufficiently low ABI, i.e., at least below 30 mg/g or below 15 mg/g.

We have also discovered that a low-ABI carbon mercury sorbent can be produced by activating carbon using a carbonaceous mercury sorbent precursor consisting of wood, lignite, coconut shell, and combinations thereof, and activating or reactivating the mercury sorbent precursor by a method selected from the group consisting of activating with steam, activating with $CO_2$, activating in an environment containing free oxygen, and combinations thereof, to provide an activated carbonaceous mercury sorbent, wherein the activation temperature and time period is limited such that the ABI of the activated carbonaceous mercury sorbent does not exceed 30 mg per gram of sorbent.

In one aspect, standard activated carbon production equipment can be utilized and no post-treatment processing of the activated carbon is required. In another aspect, a coal feedstock is finely ground and pelletized with a binder prior to the devolatilization/carbonization and activation steps. In one aspect the devolatilization and carbonization of the carbon feedstock may be accomplished in an oxygen-depleted environment, to prevent excessive combustion of the product. In another aspect, bromine addition to increase the mercury capture effectiveness of the carbon can be integrated into the sorbent manufacturing process. Post-treating the activated carbon with an effective amount of ozone or nitric acid to lower AEA adsorption is unnecessary.

To produce a composition that can successfully lock away captured mercury in a strong, durable, air-entrained concrete, the novel low-ABI PAC and fly ash can be intimately intermixed during the mercury removal process at the power plant. This can be accomplished by injecting the PAC into the fly-ash-laden flue gas and collecting them together in a particulate removal device. Low-ABI PAC can also be injected into the mercury-containing exhaust gas of cement kilns, to be collected with the cement kiln dust for use in concretes.

Compositions comprising the low-ABI PAC and fly ash can be combined with AEAs, water, cement, and sand to sequester the captured mercury in a mortar, and with course aggregate, into a concrete. Compositions containing the low-ABI PAC and cement kiln dust can similarly be combined with these materials to sequester captured mercury into mortar or concrete.

Novel compositions combining carbonaceous mercury sorbents with low ABI values and coal combustion fly ash can advantageously sequester mercury from the environment in strong, durable, impermeable, air-entrained concretes. Both materials are important to this end.

A low-ABI carbon is important because it allows the proper amount of AEA to manifest itself in the proper amount of concrete air voids. If the AEA action is interfered with and too few bubbles are produced, then the concrete will fracture when interstitial water freezes and expands. If AEA addition overcompensates and too many bubbles are created, or they are too large, the concrete will fracture due to a lack of strength. But, if the PAC has only a minimal adsorption of AEA, then any natural variations in their proportions will be small, and the intended degree of AEA action and concrete voids will result.

The included fly ash is also important, because high-calcium Type C fly ash has pozzolanic properties. A pozzolan is a siliceous or siliceous and aluminous material, which in itself possesses little or no cementing property, but will, in a finely divided form and in the presence of moisture, chemically react with calcium hydroxide given off by hardening cement to further form compounds possessing cementitious properties. Partially substituting pozzolanic fly ash for a portion of the cement in a concrete results in increased density and long-term pozzolanic action, which ties up free lime, resulting in fewer bleed channels and decreased concrete permeability. Further, the denser resulting concrete helps keep aggressive compounds on the surface, where destructive action is lessened. Concrete incorporating pozzolanic fly ash is also more resistant to attack by sulfate, mild acid, soft water, and seawater. The net effect is a greater sequestration of the captured mercury in the PACs contained in the concrete and significantly decreased exposure to the environment.

While not desiring to be limited by theory, the inventors believe that the keys to creating carbonaceous mercury sorbents that can be used together with fly ash in air entrained concretes are: 1) a minimized PAC mesoporosity and, or, 2) a proper carbon surface chemistry. Activated carbons heretofore used for power plant mercury reduction do not possess these required properties to the required degrees. The required carbon properties can be characterized by a new metric, denoted as the ABI. A sufficiently-low ABI indicates the required combination of minimal mesoporosity and proper surface chemistry necessary for a low degree of adsorption of air-entraining admixture chemicals in a concrete slurry. Activated carbons with sufficiently low ABIs have not heretofore been used for mercury emission reductions at coal-fired utility boilers.

Mesoporosity comprises the medium-sized pores and channels that link the large openings of the PAC particle to the high surface area of its microstructure. According to the International Union of Pure and Applied Chemistry's guidance on Reporting Physiosorption Data for Gas/Solid Systems (1985), activated carbon pores with widths less than 2 nm are considered micropores. Pores with widths between 2 and 50 nm are considered mesopores and pores with widths exceeding 50 nm are considered macropores.

Activated carbons are usually produced to provide maximum surface area for a given production cost, including high mesoporosity. In this way the mercury, or other target adsorbates, will have the least obstructions in finding sequestration sites in the mesopores and micropores. To create a concrete-friendly carbonaceous mercury sorbent, on the other hand, the carbon's mesoporosity must be minimized, while retaining adequate reactive microporosity. AEA compounds are relatively large molecules, on the order of one to three nanometers long. While not wishing to be limited by theory, it is believed that by minimizing the number of pores that the AEA molecules can fit into or be transported through, the amount of AEA that can be deleteriously adsorbed from the concrete slurry can also be minimized.

While not wishing to be bound by theory, the inventors believe the particular surface chemistry of the carbonaceous mercury sorbent to be important in determining the degree of AEA adsorption on PACs. The presence of particular oxygen functional groups on the surface of the PAC and the net charge of the surface could promote or impede the attachment of AEAs. Oxygen-containing functional groups created during air activation should impart an acidic, hydrophilic character to the carbon surface, which can repel the hydrophilic heads of the AEA molecules at pHs above the $pH_{pzc}$. By increasing the hydrophilicity of the PACs, for example, the adsorption of AEAs may be retarded, with little deleterious effect on gas-phase mercury adsorption.

In the United States, traditional bulk activated carbons are commercially produced from wood and wood waste, from low-rank lignite, and from bituminous coal. Worldwide, activated carbons are also commercially produced from vegetation such as coconut shells and other nut shells or husks, peat, subbituminous coal, and anthracite as well.

Previously, it had been discovered that low-ABI carbons suitable for use in air-entrained concrete can be produced by using anthracite or bituminous coal as the original feedstock material. See Publication No. US 2010-0212550. Surprisingly, the inventors have now discovered that low-ABI carbons suitable for use in air-entrained concrete can be produced by specifically using wood, lignite, and/or coconut shell as the original feedstock material.

To produce concrete-friendly carbonaceous mercury sorbents using wood, lignite, and/or coconut shell as the original feedstock material, a carbonaceous feedstock must first be pre-processed.

Bulk commercial activated carbons are typically produced in a two-step process. First, the carbon-containing raw material is devolatilized with heat in an oxygen-depleted environment (less than 21 percent oxygen), driving off volatile compounds and carbonizing the material. The result is a char without a large internal surface area.

Traditional activated carbon production equipment can be utilized without major modifications, if desired, to produce the concrete-friendly PACs. Changes to the first devolatilization/carbonization step in activated carbon production are not anticipated. However, some modification of conditions may be required when replacing, for example, a low rank feedstock such as lignite with a high rank feedstock such as anthracite. The devolatilization/carbonization step is still expected to occur in an oxygen-depleted environment, to prevent excessive combustion of the resulting carbonized char.

Some changes may be required in the second step, activation, if the activation agent is changed to air. Air activation is highly exothermic, compared to endothermic activation with steam and carbon dioxide, and must be tightly controlled to prevent runaway combustion. However, if done carefully, only modest changes to equipment and procedures may be necessary.

It is significant that no post-treatment processing of the powdered activated carbon is required to lower its interaction with AEAs. Neutralization of AEA adsorption is inherent in the PAC production process itself. Treating the PAC with ozone or nitric acid or other strong oxidization agents to alter its surface is unnecessary. If a PAC is manufactured with a low enough ABI, however, such an additional treatment would not put its use outside of the intended coverage of this invention.

Carbons with a low ABI may also be post-treated with bromine, bromine salts, or other additives, for increased mercury capture performance. An example may be found in U.S. Pat. No. 6,953,494. The use of such mercury-performance-enhancing agents can be combined with this invention to increase the PACs' mercury capture.

To produce a composition that can successfully lock away captured mercury in a strong, durable concrete, the low-ABI PAC and the fly ash should be intimately intermixed. This can be accomplished in the mercury removal process at the power plant.

Novel compositions sometimes require novel metrics. Catalytic carbons, for example, can be identified by a special metric, the t-¾ measurement defining such carbons in Matviya, U.S. Pat. No. 5,356,849. To enable use sequestering mercury in typical air-entrained concretes, activated carbon must be created with a sufficiently low ABI. It was discovered that Acid Blue 80 has molecular properties that are relevant to the AEAs used in concrete formulations. Acid Blue 80 adsorptive capacity, i.e., ABI, is a good indicator of the carbon surface chemistry and mesopore requirements for acceptable concrete air entrainment. Novel compositions combining low ABI carbonaceous mercury sorbents and coal combustion fly ash are capable of being successfully used to sequester mercury in strong, durable, air entrained concretes.

If the carbon has a low effect on the resulting concrete void space, then there will be little variation in that effect when naturally-varying amounts of adsorbent contained in different fly ash shipments are sent to the ready-mix concrete plant. In this way, a standard AEA dosage can be used without fear that too few void spaces will be produced in the concrete, leading to cracking and disintegration upon freezing, or that too many void spaces will be created, with a consequent loss of required concrete strength.

First, a detailed description of determination of the ABI is provided. A carbonaceous mercury adsorbent's ABI value indicates whether a fly ash containing such a carbonaceous mercury adsorbent will be suitable for use in an air-entrained concrete. A carbon's ABI may be determined as described below.

A. Preparation of a Standard, Original Acid Blue 80 (AB-80) Solution 0.1 g of AB-80 (CAS 4474-24-2, e.g. Acros Organics) is first dissolved in a small quantity of deionized water. The solution is transferred into a 1.0 liter volumetric flask and diluted to 1.0 liter. The concentration of the solution, Co, is then determined as $$C_o = W*1000$$

where:
$C_o$=concentration of original AB-80 solution, mg/liter; and
W=mass of AB-80, g.

B. Deriving a Working Curve for the AB-80 Solution 0, 1, 3, 5, 8, 12, 16, 20, and 25 ml, respectively, of the above AB-80 original solution is pipetted into 25 ml volumetric flasks and diluted to 25 ml using deionized water. The concentration of the solutions in each flask would be:

$$C_s = C_o * V_s / 25$$

where:
$C_s$=concentration of diluted AB-80 solution, mg/liter
$C_o$=concentration of original AB-80 solution, mg/liter; and
$V_s$=volume of AB-80 solution pipetted, ml.

Using a spectrophotometer, the absorbencies of the above solutions are then determined at a wavelength of 626 nm. The absorbencies of the solutions are next plotted against their concentrations.

A linear working curve is obtained by applying a linear least-squares regression to the resulting data.

C. Sample Test Method. (For Guidance see ASTM D 3860-98 Standard Practice for Determination of Adsorptive Capacity of Activated Carbon by Aqueous Phase Isotherm Technique)

The AB-80 adsorptive capacity of an activated carbon is then determined by contacting the standard AB-80 solution with the activated carbon. The relative amount of AB-80 removed is determined by the difference of AB-80 solution absorbance prior to and after contacting with the activated carbon, calculating the adsorptive capacity from a Freundlich isotherm plot.

If the PAC has been chemically treated prior to testing, for example with bromine or a bromine salt, then the sample should first be washed or extracted by deionized or distilled water until no such chemical can be detected. For example, 5 grams of a brominated-PAC can be washed with 500 ml of water, then filtered, and then further rinsed with 1 liter water. The PAC sample should typically oven-dry at 150 degrees C. for 3 hours prior to the AB-80 absorbance measurement.

Following the determination of a working curve for the AB-80 solution and the above-mentioned preparative steps, a carbonaceous mercury sorbent's ABI may be determined by using the following procedure:

Weigh various amounts of a PAC sample into 200 ml pre-cleaned flasks with stopper. For example, 4 different dosages may be used. The sample weights of the powdered activated carbon may have to be adjusted, depending on the adsorptive capacity of activated carbon. One guideline is the concentration of AB-80 solution after contacting activated carbon should fit into the linear range of AB-80 working curve.

Pipette 50 ml of AB-80 standard solution into each flask.

Shake and agitate the solutions for 30 minutes at 25 degrees C.

Immediately filter the samples through 0.20 micrometer membrane filters, disposing of the first 5 ml of each filtrate.

Immediately analyze the filtrates using a spectrophotometer, measuring at a 626-nm wavelength, and calculate the concentration of the AB-80 filtrate solution by comparing the absorbance to the previously-derived working curve.

Record the concentration of AB-80 in the filtrate along with the corresponding carbon mass.

Calculate the AB-80 adsorbed, X, as follows:

$$X = V(C_o - C)$$

where:

X=amount of AB-80 adsorbed, in mg;

$C_o$=concentration of original AB-80 solution prior to contact with the PAC, in mg/liter;

C=concentration of the AB-80 solution after contacting the PAC, in mg/liter; and V=volume of AB-80 solution added, 0.05 L.

Determine the amount of AB-80 adsorbed per unit weight of the PAC, X/M as follows:

$$X/M=(C_oV-CV)/M$$

Where:

X/M=AB-80 adsorbed per gram of carbon, in mg/g;

M=mass of the PAC, g.

Calculate the logarithm of C, the concentration of AB-80 solution after the contacting PAC in mg/liter, and the logarithm of (X/M), the AB-80 adsorbed per gram of carbon in mg/g. Plot log C on the abscissa and log(X/M) on the ordinate, and using linear least-squares regression correlate the data. If the square of the correlation coefficient, $R^2$, is less than 0.90, repeat steps 1-9 until a better correlation is obtained.

Extrapolate the linear trend line to log $C_o$, the original AB-80 concentration, and calculate the corresponding X/M from log(X/M) at $C_o$. The X/M at $C_o$ in the linear log C versus log(X/M) trend-line is the ABI of the carbon sorbent sample.

EXAMPLES

The following examples are illustrative of the principles of this invention. It is understood that this invention is not limited to any one specific embodiment exemplified herein, whether in the examples or the remainder of this patent application.

Comparative Example 1

Currently Known Mercury Sorbents

Powdered activated carbons (PACs), most of which have been used in full-scale power plant mercury control trials, were procured from major commercial carbon vendors. The ABI's of these PACs were determined by the method described herein. These values appear below in Table 1.

TABLE 1

| Ref | Producer | Product | Precursor | Activation | ABI (mg/g) |
|---|---|---|---|---|---|
| A | Norit | DARCO ® Hg | Lignite | Steam | 124 |
| B | Norit | DARCO ® Hg-LH | Lignite | Steam | 120 |
| C | Calgon | FluePAC ® | Bituminous | Steam (reactivated) | 40 |
| D | Calgon | WPL | Bituminous | Steam | 80 (avg.) |
| E | Carbochem | FGC | Bituminous | Steam | 45 |
| F | Mead/ Westvaco | Nuchar ® SA | Wood | Chemical | 60 |
| G | Jacobi | ColorSorb | Coconut | Steam | 39 |
| H | Mead/ Westvaco | MDLY | Wood | Steam | 74 |

These known mercury sorbents have very high ABIs and should preferably be used only at de minimis levels with fly ash in air-entrained concretes due to their high adsorption of AEAs.

Comparative Example 2

Concrete-Friendly Carbons from Anthracite

Powdered activated carbon mercury sorbents with low ABIs were produced in the laboratory using the customary two-step devolatilization/carbonization and activation sequence. They were produced in a laboratory fluidized bed reactor, rather than a kiln or furnace, but those skilled in the art will recognize that similar materials could be produced in a kiln and furnace or multi-hearth furnace by modifying the pertinent equipment temperatures, residence times, and other relevant processing parameters. The various coal feedstocks came from coal suppliers and The Pennsylvania State University's Coal Sample Bank, the latter samples denoted PSOC.

First, all of the different coal feedstock samples were crushed and sized. Materials between 50-mesh size and 100-mesh size (U.S. Standard Series sieves) were then gradually devolatilized and carbonized in a hot, inert atmosphere (N2) in the fluidized bed reactor. The devolatilization and carbonization step was generally accomplished by heating to 150 degrees C. at about 100 degrees C./hour, then from 150 degrees C. to 550 degrees C. at about 250 degrees C./hour, and finally from 550 degrees C. to 850 degrees C. at about 300 degrees C./hour. The low-volatile bituminous sample was preoxidized with about 2.5 liters/min of $O_2$ at 300 degrees C. for 2 hours prior to devolatilization to prevent caking.

Carbonized chars made from each coal rank were activated in air with 20.9% oxygen. Additional chars made from anthracite were also activated in an inert environment with steam. The PACs that underwent activation in air did so at 450 degrees C. for about 3 hours under an air flow of approximately 2.5 liters per min. of $O_2$ per kg of raw coal feed. The PACs that underwent steam activation did so at about 850 degrees C. with about 0.20 kg of steam per hr per kg of raw coal feed. The PACs that underwent activation in both environments did so for about half the time at each condition.

After activation, the materials were cooled down to ambient temperatures under an inert gas atmosphere. The resultant activated carbons were then ground to a size less than 325-mesh and their ABI values were determined.

The resulting PACs' mercury removal abilities were also ascertained after first being brominated to 5 wt % according to the method provided by U.S. Pat. No. 6,953,494. The mercury-capture performance of the resultant brominated PACs were then tested in an 85 $m^3$/hr (50-acfm) pilot duct-injection system with a simulated coal-fired flue-gas stream. The mercury mass transfer to the entrained sorbent and the adsorption kinetics in this system were similar to that in a full-scale utility application. The fully-instrumented duct-injection test system that was used included a methane burner unit to generate the hot flue gas; a humidification drum to add an appropriate degree of moisture to the gas; a mercury spiking sub-system with elemental mercury or mercury chloride permeation tubes; a flue gas spiking sub-system with mass flow controllers for $SO_2$, $NO_X$, and HCl; a small sorbent feeder and fluidizing injection sub-system to lessen sorbent pulsing; 10 meters of insulated, 10-cm diameter ducting circling the ceiling; thermocouples, an electrostatic filter with an effective specific collection area (SCA) of about 2500 $m^2$/kNm$^3$ (500 $ft^2$/Kacf); a back-up fabric filter; a safety filter; an orifice plate to measure flow; and a variable-speed induced-draft fan. The gas temperature at injection was about 175 degrees C. and at the ESP was about 145 degrees C. The spiked flue-gas concentrations were approximately 10 μg/Nm$^3$ Hg, 600 ppm $SO_2$, 300 ppm $NO_X$, and 5 ppm HCl, which are typical values for a flue gas at a coal-fired power plant. Mercury measurements before and after sorbent injection were taken using a continuous cold vapor atomic adsorption (CVAA) mercury analyzer, the Ohio Lumex Model 915. The sorbent injection rate used was about 90 mg/Nm$^3$ (4 lb/MMacf).

All of the PACs exhibited acceptable mercury removal capabilities and all were manufactured with acceptable yields.

The ABI's of these materials were then determined and are presented in Table 2.

TABLE 2

| PAC Ref | Source | Precursor | Activation | Hg Removal | Yield | ABI (mg/g) |
|---|---|---|---|---|---|---|
| 2 | Consol Coal | Bitum-LV | Air | 51% | 56% | 7 |
| 3 | Jedo Coal | Anthracite | Steam | 69% | 74% | 4 |
| 4 | PSOC 1558 | Anthracite | Steam | 58% | 69% | 10 |
| 5 | Jedo Coal | Anthracite | Air | 58% | 78% | 2 |
| 6 | PSOC 1558 | Anthracite | Air/Steam | 85% | 50% | 15 |
| 7 | PSOC 1558 | Anthracite | Steam/Air | 69% | 60% | 6 |

These examples of mercury sorbents all have ABIs of 15 mg/g or lower. Their surface chemistries and/or pore structures thus allow them to be mixed with fly ash to sequester captured mercury in air-entrained concretes and mortars.

PAC 2 was unconventionally activated in air. PACs 3 and 4 were activated traditionally utilizing steam, but were manufactured from anthracite.

To achieve the lowest ABI and have the least deleterious effect on air-entraining admixtures, PAC 5 combined both techniques, utilizing anthracite and activation in air. PACs 6 and 7 also achieved excellent results by utilizing anthracite and partial air activation.

Comparative Example 3

Additional PACs

Additional PACs were produced according to methods of Comparative Example 2, all with steam activation. The relevant parameters and results are provided in Table 3 below.

Many different anthracites can be used to produce concrete-friendly mercury sorbents with traditional steam activation. The feedstocks for PACs 2 and 3 from Comparative Example 2, for example, were from different sources. The former came from the Jedo Coal Company and the latter, from The Pennsylvania State University Coal Sample Bank.

TABLE 3

| Ref | Source | Precursor | Hg Removal | Yield | ABI |
|---|---|---|---|---|---|
| 3 | Jedo Coal Co. | Anthracite | 69% | 74% | 4 |
| 4 | PSU PSOC 1558 | Anthracite | 58% | 69% | 10 |
| 8 | Consolidation Coal-Buchanan | Bitum-LV | 30% | 75% | 1 |
| 9 | Thompson Bros. Mining | Bitum-HV | 80% | 27% | 80 |

It is also possible to make a concrete-compatible mercury sorbent from a bituminous coal without having to resort to air activation if the feedstock has sufficiently-low volatility. PAC 8 had a very low ABI, but it was not fully activated and its mercury removal rate was low. It is envisioned that slightly more activation would have brought its yield down and mercury removal rate up. This would have raised its ABI, but still to an acceptably low level. PAC 9, from a high-volatile bituminous coal, on the other hand, had an ABI of 80 and so was not a concrete-compatible mercury sorbent.

Comparative Example 4

Air-Entrained Concretes

Fly-ash-containing concretes with different PACs, were produced to examine their relative resulting air entrainment. The Norit DARCO® Hg known sorbent, with an ABI around 120, was compared to PAC 2 from Comparative Example 2, an air-activated carbon with an ABI of 7.

Concrete samples of four different compositions were produced. Each contained portland cement, fly ash replacing a typical 20% of the cement, sand, aggregate, water, and a standard amount of a common air-entraining admixture, Darex® II (W. R. Grace, Cambridge, Mass.). The fly ash came from We Energies' Pleasant Prairie power plant, a representative utility mercury control site.

One of the concrete formulations contained no mercury PAC. Another of the compositions contained DARCO® Hg mixed in with respect to the fly ash at 1.0 weight percent, a level representing a modest mercury sorbent injection rate at a power plant. The remaining two compositions contained the PAC 2 from Comparative Example 2 mixed in with the fly ash at both 1.0 wt % and 3.0 wt %, the latter representing a very high sorbent injection rate and, consequently, a higher possible degree of AEA interference if the sorbent was not compatible with concrete use.

The concrete samples were prepared according to ASTM C 192 "Standard Practice for Making and Curing Concrete Test Specimens in the Laboratory." Multiple samples from each batch were tested for their wet air entrainment according to ASTM Method C 231 "Standard Test Method for Air Content of Freshly Mixed Concrete by the Pressure Method" and their values averaged.

The air-entrainment specification for concrete is usually selected at a point within the range of 4 to 7 percent by volume. The higher the specified air entrainment, the more AEA is are added to the blend. In these tests entrained air of 6 percent by volume was targeted. Each sample included Darex II® AEA at a dosage of 52 ml per 100 kg of cement and fly ash. The results are provided in FIG. 1.

With no AEA (not shown), the standard-method concrete naturally has less than 2 percent by volume of air entrained, which is why AEAs are added. As shown in FIG. 1, with no PAC, but with the proper amount of AEA, the concrete sample achieved a targeted 6 percent by volume entrained air (leftmost black bar, labeled "0 (Control)").

When only 1 percent by weight of a high-ABI PAC, Norit's DARCO® Hg, is added to the fly ash portion, the AEA agent in the mix is made useless (short gray bar). The AEA is adsorbed by this PAC and the resulting degree of air entrainment is nearly the same as the natural level, i.e. the level of air entrainment without any AEA chemicals. However, if 1 percent by weight, or even 3 percent by weight of the low-ABI PAC is used as the mercury sorbent, then the proper amount of air is entrained in the concrete and a fly ash containing such a sorbent is suitable for commercial sale as a cement substitute.

Figure 2:
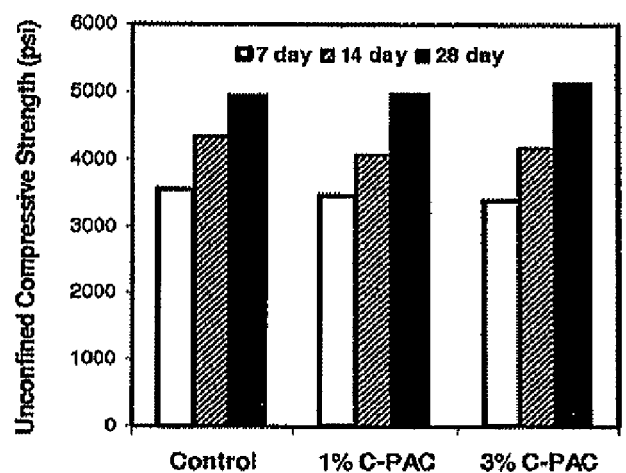
FIG. 2 is a bar chart indicating the compressive strengths of concrete samples made containing 0, 1, and 3 weight-percent of a concrete-friendly PAC.

As provided in FIG. 2, concrete compression strength tests were performed on various samples of the FIG. 1 concretes made according to ASTM C 192 that had cured for 7, 14, and 28 days. When tested according to ASTM C 39 "Standard Test Method for Compressive Strength of Cylindrical Concrete Specimens," the concretes with PAC 2 at 1 and 3 weight percent with respect to the fly ash exhibited compressive strengths equivalent to that of the control samples which had no mercury sorbents present in the fly ash.

Example 1

Mercury Performance and ABI of Coconut-Shell Based PACS of this Invention

Powdered activated carbons made of coconut shell, A-D in Table 4 below, were produced utilizing common full-scale activated carbon production line equipment. While coconut shell feedstocks allow for the production of concrete-friendly mercury sorbent if properly manufactured, they do not automatically produce PACs with low ABIs. Using techniques well known to those skilled in the art, the temperature, residence time, steam rates, and other process parameters were iteratively chosen to produce materials of sufficiently low ABI. The thus-produced powdered activated carbons made of coconut shell, A-D in Table 4 below, were brominated to 5 wt % of Br. Mercury performance of these brominated samples was tested in a pilot system with simulated flue gas as described in Comparative Example 2. The concrete-friendliness of each PAC was characterized by the ABI method. PACs A-E are coconut shell-based sorbents. The comparative samples, labeled C-PAC2 and C-PAC, are anthracite-based concrete-friendly mercury sorbents of Albemarle Corporation.

TABLE 4

Mercury performance and ABI of coconut-shell based PACs of this Invention

| PAC | Avg Hg removal % | ABI mg/g |
|---|---|---|
| A | 59 | 4.9 |
| B | 60 | 4.8 |
| C | 65 | 6.5 |
| D | 66 | 5.7 |
| C-PAC2 | 64 | 8.7 |
| C-PAC | 57 | 9.2 |

The properties of concretes made with PACs of this invention are substantially the same as those made with anthracite-based and bituminous-based C-PACs.

Example 2

Additional PACs from Wood

Additional PACs were produced from wood chips in the laboratory using the same fluidized bed reactor as discussed in Comparative Example 2. The wood chips were hardwood chips and came from whole tree. The wood chips were dried then gradually devolatilized and carbonized in a hot, inert atmosphere in the fluidized bed reactor. The devolatilization and carbonization step was generally accomplished by heating up the wood chips to the carbonization temperature at the heat up rate listed in the below Table 5. The carbonized chars were then activated in steam at the temperature listed in the below Table 5.

After activation, the materials were cooled down to ambient temperature under an inert atmosphere. The resultant activated carbons were then ground to a size less than 325-mesh and their ABI values were determined.

TABLE 5

| Ref. | Pre-Cursor | I | II | III | IV | V | VI | Yield (%) | ABI (mg/g) |
|---|---|---|---|---|---|---|---|---|---|
| 15-5 | Wood | 730 | 6 | 30 | 805 | 20 | high | 18.2 | 7 |
| 16-5 | Wood | 800 | 4 | 0 | 800 | 30 | low | 17.3 | 6 |
| 17-5 | Wood | 825 | 3 | 0 | 825 | 40 | mild | 17.5 | 14 |
| 18-5 | Wood | 750 | 6 | 30 | 800 | 35 | low | 16.2 | 8 |
| 20-5 | Wood | 750 | 5 | 30 | 800 | 40 | low | 19.8 | 10 |

I - Carbonization Temperature (deg. C.)
II - Carbonization Heatup Rate (deg. C./min.)
III - Carbonization Time (min.)
IV - Activation Temperature (deg. C.)
V - Activation Time (min.)
VI - Steam Concentration More PACs were produced from the same hardwood chips as in Table 5 in a pilot rotary kiln using similar conditions as in Ref. 20-5 which was made using the laboratory fluidized bed reactor. The resultant PAC's mercury removal abilities were also ascertained according to the method in Comparative Example 2 after being brominated to 10 wt % according to the method provided by U.S. Pat. No. 6,953,494. The relevant results are provided in Table 6 below.

TABLE 6

| Ref | Precursor | ABI (mg/g) | Hg Removal (%) |
|---|---|---|---|
| 21-5 | Wood | 11 | 72 |
| 22-5 | Wood | 12 | 73 |

The PACs made from the pilot rotary kiln have similar ABIs as those made from the lab fluidized bed reactor using similar process conditions and the same hardwood chips. PAC 21-5 and PAC 22-5 have ABIs of 11 and 12 and mercury removal of 72% and 73%, respectively.

Example 3

Additional PACs from Lignite

Additional PAC was produced from lignite according to methods of Comparative Example 2 with air activation, except the lignite samples were devolatilized and carbonized to 850 degrees C. at about half the rate as the others from Comparative Example 2 and over a longer period. The relevant parameters and results are provided in Table 7 below.

TABLE 7

| Ref | Source | Precursor | Hg Removal | Yield | ABI (mg/g) |
|---|---|---|---|---|---|
| 1 | PSOC 1442 | Lignite | 48% | 22% | 21 |
| 28 | PSOC 1442 | Lignite | 35% | 29% | 9 |

Many different precursors can be used to produce concrete-friendly mercury sorbents with the techniques taught in this patent application. The PAC in this example was made from lignite by air activation, but those skilled in the art will recognize that similar materials could be produced by steam activation or $CO_2$ activation or chemical activation, or from different precursors.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting combination or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a combination to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof. As will be familiar to those skilled in the art, the terms "combined", "combining", and the like as used herein mean that the components that are "combined" or that one is "combining" are put into a container with each other. Likewise a "combination" of components means the components having been put together in a container.

While the present invention has been described in terms of one or more preferred embodiments, it is to be understood that other modifications may be made without departing from the scope of the invention, which is set forth in the claims below.

What is claimed is:

1. A method comprising:
providing a carbonaceous mercury sorbent precursor consisting of wood, lignite, coconut shell, and combinations thereof;
activating or reactivating the mercury sorbent precursor by a method selected from the group consisting of activating with steam, activating with $CO_2$, activating in an environment containing free oxygen, and combinations thereof, to provide an activated carbonaceous mercury sorbent, wherein the activation temperature and time period is limited such that the Acid Blue 80 Index of the activated carbonaceous mercury sorbent with no post-treatment does not exceed 30 mg per gram of sorbent;
grinding the activated carbonaceous mercury sorbent with no post-treatment after activation or reactivation to an average particle size less than about 325 mesh;
injecting the activated carbonaceous mercury sorbent with no post-treatment into a gas stream containing mercury, mercury-containing compounds, or a combination thereof, and fly ash, cement kiln dust, or a combination of fly ash and cement kiln dust, and allowing the activated carbonaceous mercury sorbent with no post-treatment to contact the mercury or mercury-containing compounds to create mercury sorbent with adsorbed mercury; and
removing the mercury sorbent with adsorbed mercury along with fly ash, cement kiln dust, or both, from the gas stream in a particulate control device, such that the mercury sorbent with adsorbed mercury along with fly ash, cement kiln dust, or both, is suitable for combining with an air-entraining admixture to provide a cementitious or pozzolanic composition.

2. The method of claim 1, additionally comprising:
adding the mercury sorbent with adsorbed mercury along with fly ash, cement kiln dust, or both, to water, cement, and an air-entraining admixture to provide a cementitious or pozzolanic composition.

3. The method of claim 2, additionally comprising adding sand and coarse aggregate.

4. The method of claim 1, wherein activating the mercury sorbent precursor comprises activating with steam.

5. The method of claim 1, wherein activating the mercury sorbent comprises activating in an environment containing free oxygen.

6. The method of claim 1, wherein activating the mercury sorbent precursor is performed using a rotary kiln, activation furnace, or multi-hearth furnace.

7. The method of claim 1, additionally comprising adding at least one halogen or halogen compound to the activated carbonaceous mercury sorbent to create a halogenated activated carbonaceous mercury sorbent which contains about 0.1 to about 15 percent by weight halogen.

8. The method of claim 1, wherein the activation is further limited in temperature and time period such that the Acid Blue 80 Index of the activated carbonaceous mercury sorbent with no post-treatment does not exceed 15 mg per gram of sorbent.

9. The method of claim 8, additionally comprising adding the mercury sorbent with adsorbed mercury with either fly ash, cement kiln dust, or both to water, cement, and an air-entraining admixture to provide a cementitious or pozzolanic composition.

10. The method of claim 8, wherein activating the mercury sorbent precursor comprises activating with steam.

11. The method of claim 8, wherein activating the mercury sorbent comprises activating in an environment containing free oxygen.

12. The method of claim 8, wherein activating the mercury sorbent precursor is performed using a rotary kiln, activation furnace, or multi-hearth furnace.

13. The method of claim 8, additionally comprising adding at least one halogen or halogen compound to the activated carbonaceous mercury sorbent to create a halogenated activated carbonaceous mercury sorbent which contains about 0.1 to about 15 percent by weight halogen.

14. A composition comprising:
a powdered activated carbon having mercury or mercury-containing compounds adsorbed thereon, the powdered activated carbon consisting of a carbonaceous mercury sorbent precursor that was activated or reactivated with steam, $CO_2$, free oxygen, or combinations thereof, such that the Acid Blue 80 Index of the powdered activated carbon with no post-treatment does not exceed 30 mg per gram of sorbent;
either fly ash, cement kiln dust, or a combination thereof; and
cement, an air-entraining admixture, sand, and water,
wherein the carbonaceous mercury sorbent precursor is selected from the group consisting of wood, lignite, coconut shell, and combinations thereof.

15. The composition according to claim 14, additionally comprising coarse aggregate.

16. The composition according to claim 14, wherein the powdered activated carbon is produced from a carbonaceous mercury sorbent precursor activated or reactivated in an environment containing free oxygen such that the Acid Blue 80 Index of the activated carbonaceous mercury sorbent does not exceed 30 mg per gram of sorbent with no post-treatment.

17. The composition according to claim 14, wherein the powdered activated carbon has an Acid Blue 80 Index of less than about 15 milligrams per gram of adsorbent prior to any optional post-treatment with ozone or nitric acid.

18. The composition according to claim 14, wherein the powdered activated carbon is produced from a carbonaceous mercury sorbent precursor activated or reactivated in an environment containing free oxygen.

* * * * *